Feb. 20, 1940.　　　G. W. ASHLOCK, JR　　　2,190,970
ARTICLE LOADING DEVICE
Filed Oct. 19, 1938　　　3 Sheets-Sheet 1
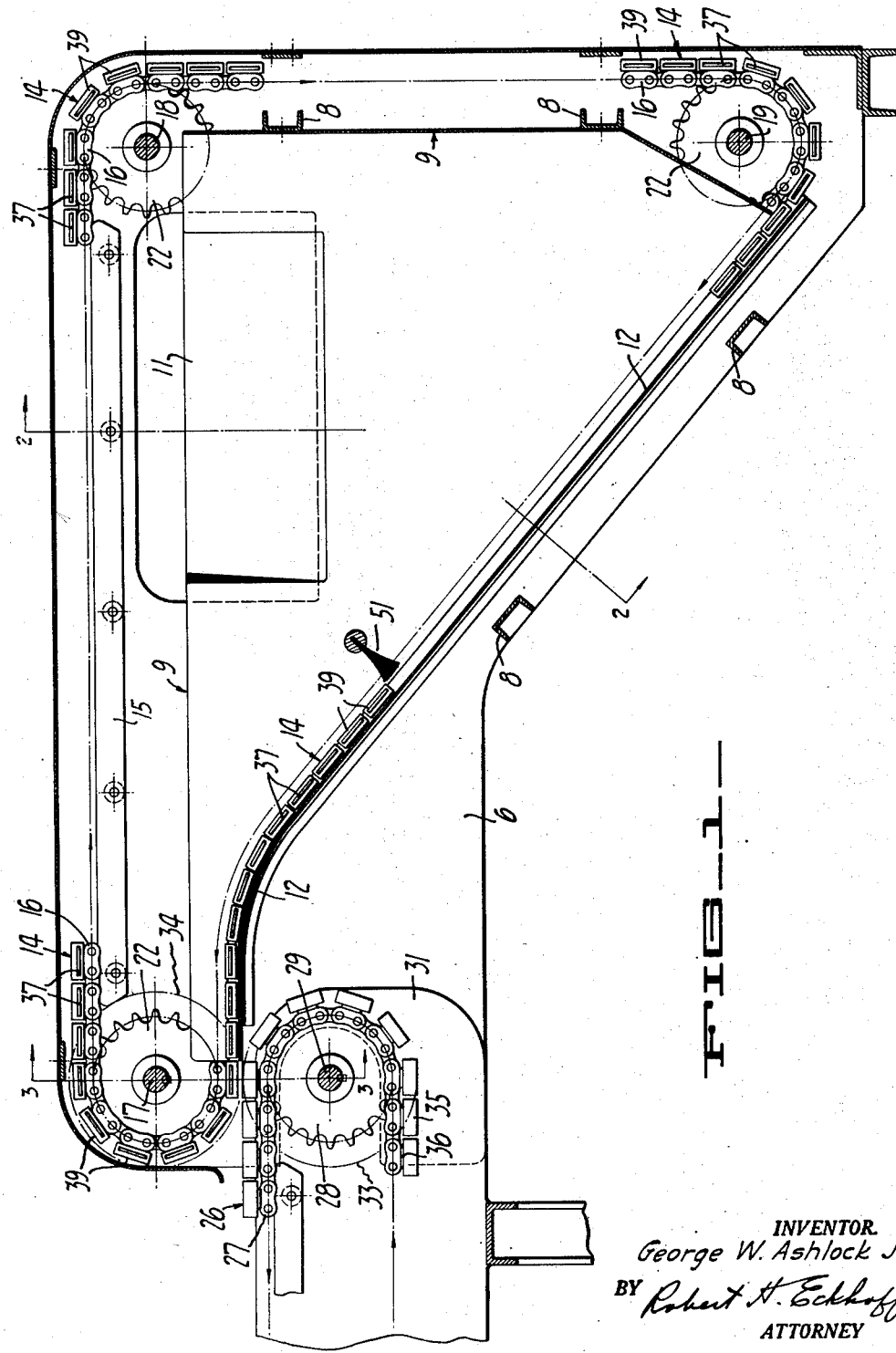
INVENTOR.
George W. Ashlock Jr.
BY Robert H. Eckhoff
ATTORNEY

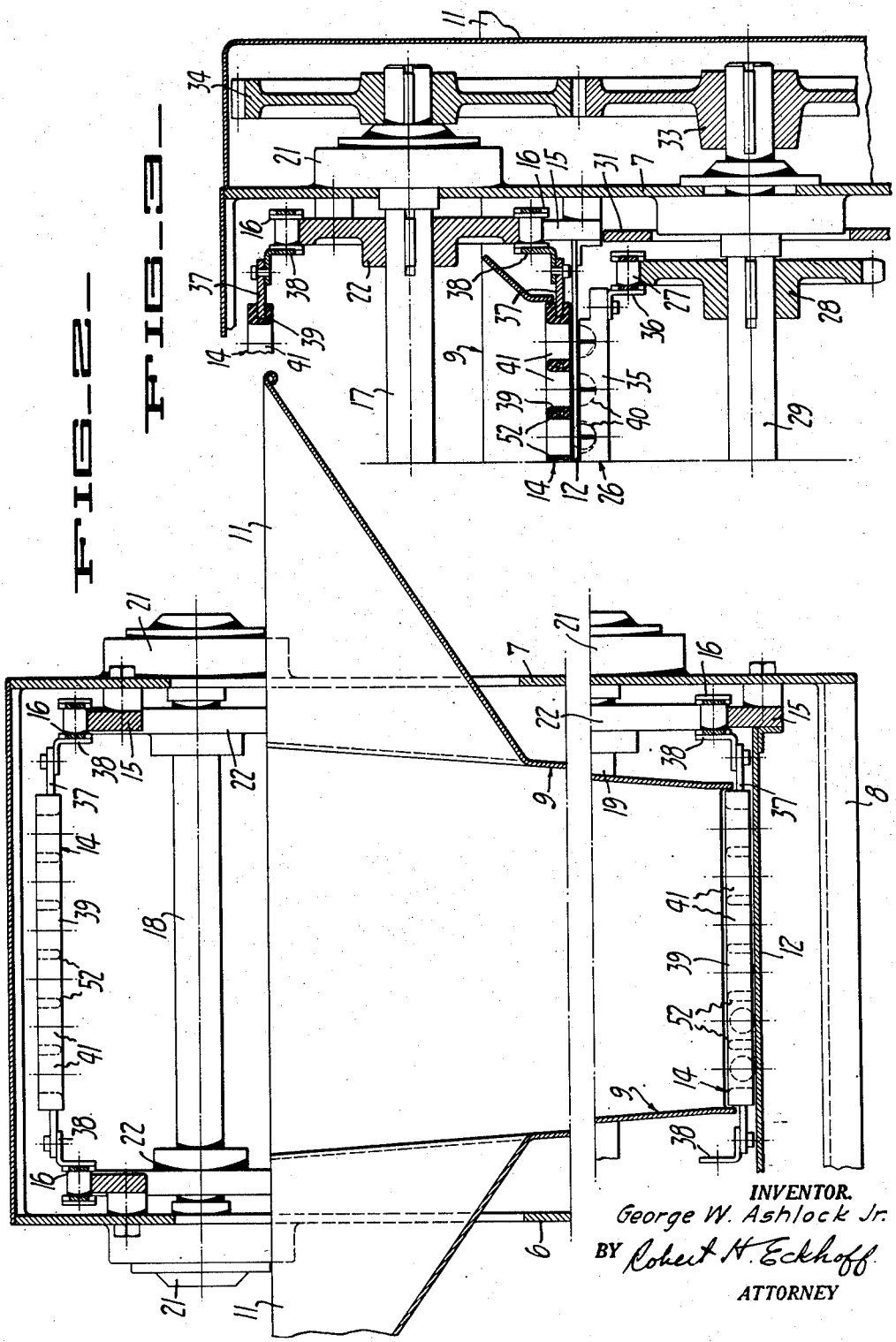

Feb. 20, 1940.  G. W. ASHLOCK, JR  2,190,970
ARTICLE LOADING DEVICE
Filed Oct. 19, 1938  3 Sheets-Sheet 3
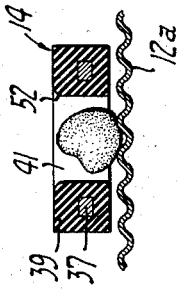
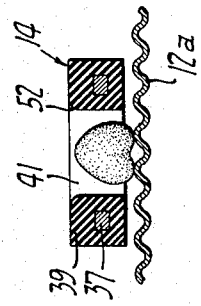
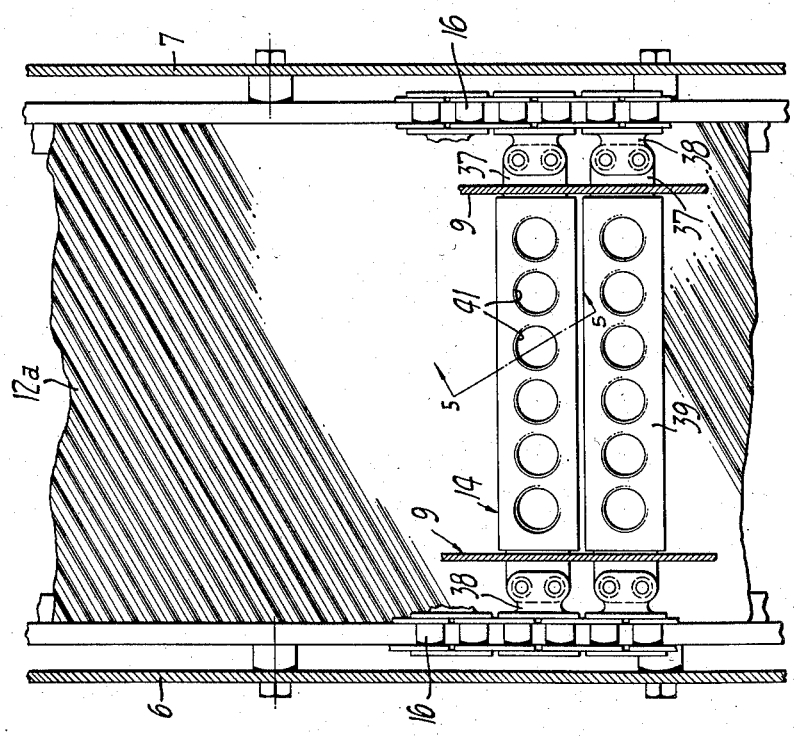
INVENTOR.
George W. Ashlock Jr.
BY Robert H. Eckhoff
ATTORNEY Patented Feb. 20, 1940

2,190,970

UNITED STATES PATENT OFFICE 2,190,970

ARTICLE LOADING DEVICE

George W. Ashlock, Jr., Oakland, Calif.

Application October 19, 1938, Serial No. 235,761

3 Claims. (Cl. 198—33)

This invention relates to an article loading mechanism and more particularly to a machine for uniformly loading a conveyor having article receptacles. Such a conveyor is employed in feeding a cherry stoner and the like.

Recent developments in machines for stoning cherries, olives, and performing like operations have provided machines which are capable of very rapid operation. Such a machine is disclosed in my prior application Ser. No. 184,007 filed January 8, 1938, now Patent No. 2,157,518. In operating this machine to provide, for example, pie cherries, it is only necessary to distribute the cherries on the conveyor mechanism carrying the cherries on to the pitting heads or knives. When maraschino cherries, or cherries stoned with the pit ejected on the longitudinal axis are desired, it is necessary to not only distribute the cherries upon the conveyor mechanism, but to position each cherry as well. This requires hand operation. When operators attempt to place the cherries and position the cherries with the stem end uppermost, a goodly number of operators are required for each machine and the labor cost incident to the operation of the machine becomes quite high. In an effort to reduce this I attempted to provide means for distributing the cherries automatically, so that the operators only had to turn the cherries in the receptacles employed to convey them to the pitting knives. To this end I attempted to employ such a distributing means as is disclosed in one typical patent of the prior art. However, I found that this mechanism was not successful, that the conveyor would leave the cherry supply hopper without all the receptacles being filled, thus reducing the capacity of the machine. Further, what cherries were deposited by the distributing means typified by said prior art patent where, in the majority of cases, lying on their sides, and only a relatively few cherries were positioned with the stem end uppermost. The fruit distributing means of the present invention obviates these various difficulties, supplying cherries to each receptacle in the conveyor with the deposited cherry, in many cases, with the blossom end uppermost so that operators do not have to turn all cherries. Further, only one cherry is placed in each receptacle, whereas in said prior art patent structure it was frequently the case that two cherries would be riding in a receptacle.

The present invention includes other objects and features of advantage some of which, together with the foregoing, will appear hereinafter wherein the present preferred embodiment of the fruit loading machine of my invention is disclosed.

In the drawings accompanying and forming a part hereof, Figure 1 is a side elevation, partly in section, of said embodiment.

Figure 2 is a section on the line 2—2 in Figure 1, while Figure 3 is a section on the line 3—3 in Figure 1.

Figure 4 is a view of the article supporting false bottom provided to turn cherries while Figures 5 and 6 are views taken on the line 5—5 of Figure 4 and illustrating how the bottom cooperates to turn the cherries to provide the blossom end uppermost.

As appears in the drawings, the machine includes opposite side plates 6 and 7 and transverse channel members 8 positioned between the side plates and securing them together to provide a structural frame and support. The side plates are spaced apart and between them is positioned a suitable hopper structure generally indicated at 9. The hopper includes flared and outwardly extending portions 11 to permit cherries to be readily dumped into the hopper.

The hopper includes a false bottom indicated at 12 and over which a conveyor indicated generally at 14 rides. This conveyor, as will presently appear, picks up cherries or other articles in the hopper and carries them along, over the false bottom 12, into a position in which conveyor 14 discharges onto conveyor 26 leading to the fruit pitting or other article handling mechanism.

The conveyor 14 includes opposite spaced chains 16 on opposite sides of the machine guided by tracks 15. Shafts 17, 18 and 19 are suitably journaled as at 21 in the side plates. Each shaft carries a pair of sprockets 22 over which the chains 16 ride.

In Figures 1 and 3 I have shown a conveyor generally indicated at 26. This conveyor is constructed after the manner of my aforementioned patent and includes opposite spaced parallel chains 27 extended over sprockets 28. The sprockets 28 are carried adjacent opposite ends of shaft 29 which is also suitably journaled in side plates 31 of the fruit conditioning machine. Shaft 29 is parallel to shaft 17 and is so positioned with respect to shaft 17 that gear 33 on shaft 29 drives gear 34 secured to shaft 17 to rotate the sprocket 22. The conveyor 14 is thus driven in time by conveyor 26 which is moved by suitable power means not shown herein but which can include the drive shown in my aforementioned patent.

The conveyor 26 includes a plurality of rubber covered strip members 35 attached by angles 36 to the opposite conveyor chains 27. Each strip includes a plurality of fruit receptacles 40 therein, these being more particularly shown in my aforementioned patent. It will suffice here to say that receptacles 40 are positioned in each strip 35 in a row which extends across the strip, the receptacles being equally spaced and adapted to receive the cherries or other articles.

The conveyor 14 likewise includes a plurality of strips 37 which are attached to the opposite conveyor chains 16 by angles 38. Each strip includes a rubber facing 39 extending over the metal strip. The metal strip is apertured as at 41 and the rubber facing is moulded around each aperture to provide a fruit receptacle.

In operation, conveyor 14 is driven in timed relation such that each strip 37 on conveyor 14 comes opposite to one of the strip members 35 on conveyor 26. Thus, conveyor 14 rides up over the false bottom 12 until it comes to the end thereof. At this point, instead of being over the false bottom, the strip member 37 is over one of the strips 35 on the conveyor 26. In this position, the fruit in the apertures 41 falls through into the receptacles in strip 35 which are in juxtaposition with the apertures in the strips 37. Thus each strip on the conveyor 26 is loaded by one of the strips in conveyor 14 as the two conveyors advance simultaneously in a timed relationship.

To ensure that fruit does not carry up between positioned pieces of fruit I preferably extend a brush or other means 51 across the face of the advancing conveyor 14 to force back into the hopper any fruit which is not actually being carried in an aperture in one of the strips 37. In this way, one ensures that the conveyor 14 will be uniformly loaded, the weight of the fruit in the hopper pressing the fruit down into the receptacles advanced by conveyor 14.

As appears in Figure 1, the rubber covered strips fit together closely to provide a flat surface in the hopper over which the excess fruit rides. Each receptacle in the conveyor 14 is rounded as at 52 (Figure 3) so that fruit enters a receptacle readily. The cherries are usually wet with water or other processing solution so that they move readily in the hopper and on the rubber surface of conveyor 14. The fruit also rolls readily on the smooth surface of the false bottom 12 so that the fruit, when it reaches the end of the bottom 12, is usually positioned with the blossom end uppermost.

To ensure delivery of each cherry with the stem end down and the blossom end uppermost, I preferably form the false bottom as a corrugated sheet 12a after the manner shown in Figures 4, 5 and 6. The sheet is placed with the corrugations at an angle to the direction of advance of conveyor 16 so that cherries advanced thereby are rotated in the confining apertures until the flat stem end is down (compare Figures 5 and 6) in which position they usually remain until deposited in the conveyor 26. The corrugated false bottom provides a simple and convenient means to rotate the cherries into a desired position. Usually an angle to the direction of conveyor advance of about 30° suffices.

I claim:

1. In a machine of the class described, fruit receiving means for holding a supply of fruit, a conveyor movable through said fruit supply and including a plurality of apertured strips, means for supporting fruit in said apertured strips and for turning the supported fruit into a desired position including a corrugated sheet portion supporting the fruit, said sheet being positioned with the longitudinal axis of the corrugations at an angle to the direction of advance of the conveyor.

2. In a machine of the class described, means for receiving a supply of substantially spherical articles such as cherries, a conveyer movable through said supply of spherical articles and having plurality of article receiving receptacles therein opening onto both the upper and the lower face of said conveyor, means for supporting said substantially spherical articles in said receptacles and for turning said supported articles substantially into a desired position including a flat corrugated sheet member extending along and substantially coplanar with the lower face of said conveyor to engage directly articles in said receptacles and thus support and turn said substantially spherical articles in said receptacles, said sheet being positioned with the longitudinal axis of the corrugations at an angle to the direction of advance of said conveyor.

3. In a machine of the class described, a first conveyor, a second conveyor movable over a path which includes a first path portion wherein said conveyor rises at an angle of less than 90° as it advances horizontally to a discharge point in said path whereat said second conveyor discharges articles downwardly into said first conveyor, said path continuing from said discharge point back, over and down in a spaced relation to said first portion to that point whereat said first portion begins, said second conveyor including a plurality of apertures therein for receiving and passing articles entering said apertures, support means substantially coextensive and coplanar with said first path portion for supporting articles in said apertures to adjacent said discharge point, and article feeding means for supplying articles to said second conveyor as it advances through said first path portion.

GEORGE W. ASHLOCK, Jr.